United States Patent
Schnarr (10) Patent No.: US 10,543,751 B2
(45) Date of Patent: Jan. 28, 2020

(54) METHOD OF COMMUNICATION BETWEEN A VEHICLE AND A WAYSIDE CONTROL UNIT FOR CONTROLLING AN INDUCTIVE ENERGY TRANSFER TO THE VEHICLE, A VEHICLE AND AN ARRANGEMENT

(71) Applicant: Bombardier Primove GmbH, Berlin (DE)

(72) Inventor: Thoralf Schnarr, Bissersheim (DE)

(73) Assignee: Bombardier Primove GmbH, Berlin (DE)

( * ) Notice: Subject to any disclaimer, the term of this patent is extended or adjusted under 35 U.S.C. 154(b) by 708 days.

(21) Appl. No.: 15/116,670

(22) PCT Filed: Feb. 4, 2015

(86) PCT No.: PCT/EP2015/052252
§ 371 (c)(1),
(2) Date: Aug. 4, 2016

(87) PCT Pub. No.: WO2015/117988
PCT Pub. Date: Aug. 13, 2015

(65) Prior Publication Data
US 2016/0347186 A1    Dec. 1, 2016

(30) Foreign Application Priority Data
Feb. 5, 2014   (GB) .................................. 1401957.4

(51) Int. Cl.
*H01F 27/42* (2006.01)
*H01F 37/00* (2006.01)
(Continued)

(52) U.S. Cl.
CPC ............. *B60L 11/182* (2013.01); *B60L 53/00* (2019.02); *B60L 53/12* (2019.02); *B60L 53/305* (2019.02);
(Continued)

(58) Field of Classification Search
CPC . H02J 5/005; H02J 7/025; H02J 17/00; H01F 38/14; B60L 11/182
(Continued)

(56) References Cited

U.S. PATENT DOCUMENTS 7,454,170 B2    11/2008  Goossens et al.
2011/0202755 A1*  8/2011  Orsini ................... H04L 63/029
                                                              713/151
(Continued)

FOREIGN PATENT DOCUMENTS

DE    202008014767 U1    4/2010
DE    102010026689 A1    1/2012
(Continued)

*Primary Examiner* — Anh Q Tra
(74) *Attorney, Agent, or Firm* — The Webb Law Firm (57) ABSTRACT

The invention relates to a method of communication between a vehicle and a wayside control unit for controlling an inductive power transfer to the vehicle, wherein the control unit controls a generation of an electromagnetic field by a primary unit with a primary winding structure of a system for inductive power transfer, wherein the vehicle includes a secondary unit with a secondary winding structure for receiving the alternating electromagnetic field, wherein charging-related data is transmitted in between the vehicle and the control unit via a first communication link, wherein the authentication-related data is transmitted from the vehicle to the control unit via a second communication link, wherein the authentication-related data is used to authenticate the charging-related data, and a vehicle and an arrangement of a vehicle and a primary unit.

16 Claims, 2 Drawing Sheets

(51) Int. Cl.
*H01F 38/00* (2006.01)
*B60L 11/18* (2006.01)
*B60L 53/00* (2019.01)
*B60L 53/12* (2019.01)
*B60L 53/65* (2019.01)
*B60L 53/30* (2019.01)
*H02J 50/80* (2016.01)
*H02J 50/90* (2016.01)
*H02J 50/10* (2016.01)
*H02J 7/02* (2016.01)

(52) U.S. Cl.
CPC .............. *B60L 53/65* (2019.02); *H02J 7/025* (2013.01); *H02J 50/10* (2016.02); *H02J 50/80* (2016.02); *H02J 50/90* (2016.02); Y02T 10/7005 (2013.01); Y02T 10/7088 (2013.01); Y02T 90/121 (2013.01); Y02T 90/122 (2013.01); Y02T 90/128 (2013.01); Y02T 90/14 (2013.01); Y02T 90/16 (2013.01); Y02T 90/163 (2013.01); Y02T 90/169 (2013.01); Y04S 30/14 (2013.01)

(58) Field of Classification Search
USPC ....................................................... 307/104
See application file for complete search history.

(56) References Cited

U.S. PATENT DOCUMENTS

| | | |
|---|---|---|
| 2012/0153894 A1 | 6/2012 | Widmer |
| 2013/0029595 A1 | 1/2013 | Widmer et al. |
| 2013/0099744 A1 | 4/2013 | Falk et al. |
| 2013/0193918 A1 | 8/2013 | Sarkar et al. |
| 2014/0004792 A1 | 1/2014 | Heuer et al. |
| 2014/0015328 A1 | 1/2014 | Beaver et al. |
| 2014/0036989 A1 | 2/2014 | Heinrich et al. |
| 2014/0059350 A1 | 2/2014 | Unagami et al. |
| 2014/0139038 A1 | 5/2014 | Konno et al. |
| 2014/0197693 A1* | 7/2014 | Fujita ................ H02J 7/025 307/104 |
| 2015/0115704 A1* | 4/2015 | Gorai ................ H02J 50/12 307/9.1 |
| 2016/0239001 A1* | 8/2016 | Chin .................. G05B 15/02 |
| 2016/0255993 A1* | 9/2016 | Feng .................. A47J 27/002 |
| 2016/0347186 A1* | 12/2016 | Schnarr ............ B60L 11/1809 |
| 2016/0347187 A1* | 12/2016 | Wierse ............. B60L 11/182 |

FOREIGN PATENT DOCUMENTS

| | | |
|---|---|---|
| DE | 102012012860 A1 | 1/2014 |
| JP | 2012249405 A | 12/2012 |
| JP | WO2013108318 A1 | 7/2013 |
| WO | 2010031687 A1 | 3/2010 |
| WO | 2011121064 A1 | 10/2011 |
| WO | 2011138059 A2 | 11/2011 |
| WO | 2012082858 A1 | 6/2012 |
| WO | 2012143266 A1 | 10/2012 |

\* cited by examiner

Fig.1

Fig.2

METHOD OF COMMUNICATION BETWEEN A VEHICLE AND A WAYSIDE CONTROL UNIT FOR CONTROLLING AN INDUCTIVE ENERGY TRANSFER TO THE VEHICLE, A VEHICLE AND AN ARRANGEMENT

CROSS-REFERENCE TO RELATED APPLICATIONS

This application is the United State's national phase of International Application No. PCT/EP2015/052252 filed Feb. 4, 2015, and claims priority to United Kingdom Patent Application No. 1401957.4 filed Feb. 5, 2014, the disclosures of which are hereby incorporated in their entirety by reference.

BACKGROUND OF THE INVENTION

The invention relates to a method of communication between a vehicle and a wayside control unit for controlling and inductive energy or power transfer to the vehicle, and an arrangement of the vehicle and an inductive power transfer station.

Electric vehicles, in particular a track-bound vehicle, and/or a road automobile, can be operated by electric energy which is transferred by means of an inductive power transfer. Such a vehicle may comprise a circuit arrangement which can be a traction system or a part of a traction system of the vehicle. Also, a vehicle can comprise a so-called receiving device adapted to receive an alternating electromagnetic field and to produce an alternating electric current by electromagnetic induction. Such a receiving device can comprise or provide the circuit arrangement, in particular a so-called secondary winding structure. Furthermore, such a vehicle can comprise a rectifier adapted to convert an alternating current (AC) to a direct current (DC). The DC can be used to charge a traction battery or to operate an electric machine. The rectifier converts the AC provided by the receiving device into the DC.

The inductive power transfer is usually performed using a primary unit which generates the alternating electromagnetic field by a primary winding structure and a secondary unit which comprises the receiving device for receiving said electromagnetic field. The primary unit and the secondary unit can e.g. each comprise a set of three-phase windings. A set of windings of the primary unit can be installed on the ground (primary windings) and can be fed by a wayside power converter (WPC). A set of windings of the secondary unit is installed on the vehicle. For example, the second set of windings can be attached underneath the vehicle, in the case of trams under some of its wagons. The set of windings of the primary unit can also be referred to as primary side, wherein the set of windings of the secondary unit can be referred to as secondary side. The first and the secondary side can be part of a high frequency transformer to transfer electric energy to the vehicle. This transfer can be done in a static state (when there is no movement of the vehicle) and in a dynamic state (when the vehicle moves).

U.S. Pat. No. 7,454,170 B2 discloses an inductive transmission system for inductive transmission of power and full duplex data signals between first and second devices. The transmission system includes a bi-directional inductive channel between the two devices, a transmitter for transmitting a power signal at a first frequency from the first device to the second device over the inductive channel, a first modulating device for modulating a first data signal at a first modulation frequency, and a second modulating device for modulating a second data signal at a second modulation frequency. Further, the transmitters transmit the modulated first data signals from the first device to the second device over the inductive channel, and transmit the modulated second data signals from the second device to the first device over the inductive channel. The first modulation frequency and the second modulation frequency are at least a factor two apart.

An inductive power transfer station can comprise one or multiple primary unit(s), wherein each primary unit can comprise a primary winding structure for generating the power transfer field. This allows inductive power transfer to multiple vehicles.

To manage the inductive power transfer to the vehicle, charging-related data needs to be transmitted between the vehicle and the inductive power transfer station, in particular a control unit of the inductive power transfer station for controlling the inductive power transferred to the multiple vehicles. Such data can encode information concerning e.g. a charging state of a vehicle-sided battery, e.g. a traction battery, a maximum admissible power to be transferred but also information regarding the billing of the transferred energy.

In particular, in the case of multiple primary units controlled by one common control unit, there is the problem of assigning a vehicle to a primary unit by which the inductive power transfer to the vehicle will be conducted. Only a correct assignment will guarantee that correct charging parameters will be used by the control unit in order to generate the power transfer field.

Another problem is that charging-related data, in particular data related to billing information, is confidential data. Thus, a secure communication between the vehicle and the control unit is desirable.

Yet another problem is that inductive power transfer usually requires a correct positioning of a secondary winding structure relative to a primary winding structure in order to maximize the amount of transfer power but also in order to meet safety requirements and provide an electromagnetic compatibility.

It is an object of the present invention to provide a method of communication between a vehicle and a wayside control unit of a system for inductive power transfer, a vehicle and an arrangement of the vehicle and the wayside control unit which allow a safe communication of charging-related data in between the vehicle and the control unit.

It is a main idea of the invention to provide a first and at least a second communication link which are independent of each other, wherein data transmitted via the second communication link is used to authenticate charging-related data transmitted via the first communication link.

Another main idea of the invention is to use the second communication link for a correct positioning of the vehicle-sided secondary winding structure relative to a primary winding structure.

SUMMARY OF THE INVENTION

A method of communication between a vehicle and a wayside control unit for controlling an inductive power transfer to the vehicle is proposed. The wayside control unit will also be referred to as control unit in the following. The control unit controls a generation of an electromagnetic field by a primary unit of a system for inductive power transfer. The electromagnetic field can be also referred to a power transfer field. In particular, the control unit can control a voltage and/or a current and/or a frequency of a voltage by which a primary winding structure of the primary unit is operated.

The vehicle comprises a secondary unit with a secondary winding structure for receiving the alternating electromagnetic field. Charging-related data is transmitted inbetween the vehicle and the control unit via a first communication link. The first communication link can also be referred to as first communication channel. Charging-related data can e.g. contain information concerning a control of the power transfer such as reference value for a current or a voltage within a secondary winding structure of the secondary unit and other, in particular non-functional, information concerning an energy provider and billing information such as a billing category. Depending on the charging-related data, the inductive power transfer is controlled by the control unit.

According to the invention, authentication-related data is transmitted from the vehicle to the control unit via the second communication link. The second communication link can also be referred to as a second communication channel. The first and the second communication link are designed and implemented independently from each other. For instance, signal transmission via the first and the second communication link can be performed with different frequencies.

Signals transmitted via the first and the second communication link can also be independent from the power transfer signal. This means that the power transfer signal is not used for communication purposes.

The authentication-related data is used to authenticate the charging-related data, in particular a transmitter of the charging-related data. Inductive power transfer depending on the charging-related data can only be performed if an authentication is successful.

This means that the communication between the control unit and a specific vehicle via the first communication link is authenticated or verified depending on or by the data transmitted via the other communication link. It is, for instance, possible that both, the charging-related data and the authentication-related data encode information concerning an identity of a vehicle. By decoding the different data sets and comparing the vehicle identity, an authentication of the data transmitted via the first communication channel can be performed.

This advantageously allows verifying that charging-related data is originated from a specific vehicle.

In a preferred embodiment, the communication via the first communication link is a bidirectional communication. The communication via the second communication link is a unidirectional communication. The second communication is, in particular exclusively, directed from the vehicle to the control unit. In this case, authentication of the data transmitted via the first communication link is performed by the control unit under consideration of the authentication-related data transmitted from the vehicle. This advantageously provides a simple setup of the two independent communication links.

In another preferred embodiment, a communication via the first communication link is a WLAN-based communication. The invention, however, is not restricted to WLAN-based communication and does also apply to all other kind of broadcast communication. Choosing the first communication as WLAN-based communication, however, advantageously allows choosing a well-established type of communication with a number of well-established protocols.

Alternatively or in addition, a communication via the second communication link is a short distance communication. A short distance communication denotes a communication, wherein data can only be reliably transmitted if a distance between a transmitting unit and a receiving unit is smaller than a predetermined distance, e.g. smaller than 0.5 m, 0.4 m or even 0.3 m. A reliable data transmission is e.g. given if a ratio between a transmission power and a receiving power is higher than a predetermined threshold value e.g. higher than 700 mV.

Furthermore, the second communication link can be established by a microwave link or radio link. This means that radio waves by which data is transmitted via the second communication link are bundled with respect to one or multiple direction(s). Preferably, radio waves are bundled and directed in a single main direction.

This advantageously allows the transmission of the authentication-related data only if a distance from vehicle-sided transmitting unit to a station-sided or wayside receiving unit is small. In particular if the receiving unit for data transmitted via the second communication link is integrated into a primary unit, e. g. a body of the primary unit, this advantageously allows guaranteeing that the vehicle, in particular the secondary unit of the vehicle, is positioned close to the primary unit. Only in this case, charging-related data can be authenticated.

Authentication of the charging-related data, however, can be a requirement for a subsequent inductive power transfer process. As a result, inductive power transfer will only be performed if the vehicle is positioned close to the primary unit, which in turn, increases the amount of power transferred to the vehicle.

In another preferred embodiment, the authentication data is transmitted as a digital certificate. In particular, the digital certificate can be a so-called public-key certificate. The public-key-certificate can be a vehicle-specific public-key certificate. Other units can use the public-key certificate of the specific vehicle to encrypt data which is transmitted to the vehicle by the respective other unit. This encrypted data can only be decrypted by the owner of the corresponding private-key certificate, namely the vehicle or a vehicle-sided control unit.

It is, for instance, possible that the control unit receives the public-key certificate of the vehicle and transmits a control unit-specific public key-certificate to the vehicle via the first communication link, wherein the public-key certificate of the control unit is encrypted using the public-key certificate of the vehicle. After transmission of the public-key certificate of the control unit, a secure bidirectional communication between the vehicle and the control unit is possible.

Thus, the exchange or transmission of charging-related data between the vehicle and the control unit can be performed after at least one public-key certificate has been received by the control unit or, if applicable, by the vehicle, e. g. a control unit of the vehicle.

In another embodiment, the authentication-related data is only valid during a single inductive power transfer process. This means that the authentication data cannot be used from the same or another control unit after the charging process for which the authentication-related data has been transmitted is terminated. This advantageously increases a security of the proposed method.

In another embodiment, data encoding a vehicle-sided transmitter identity and/or a vehicle identity is transmitted from the vehicle to the control unit via the second communication link. The said vehicle-sided transmitter is a transmitter for transmitting signals via the second communication link, in particular signals encoding the authentication-related data.

This means that the transmitter identity can be determined based on the signal transmitted via the second communication link. In particular, in the case where more than one, e.g. two, vehicle-sided transmitter each transmit a signal via the second-communication link, a reliable and unambiguously identification of the respective transmitter can be performed. This, in turn, advantageously allows a reliable authentication or verification of the charging-related data since a transmitter and/or vehicle identity transmitted via the second communication link and derived from the signal transmitted via the first communications link can be compared to a set of known authorized transmitter and/or vehicle identities. In this case, it is also possible to determine a vehicle identity based on the transmitter identity, in particular if a transmitter is unambiguously assigned to a vehicle. Such an assignment can e.g. be saved in form of a table, e.g. in an adequate memory unit.

Another advantage is that the transmitter identity can be used to determine if a correct positioning of the secondary winding structure of the vehicle relative to the primary winding structure of the primary unit is provided. This will be explained later.

In another embodiment, a signal transmitted via the second communication link is used to determine a correct position and/or orientation of a secondary winding structure of the vehicle relative to a primary winding structure of the primary unit.

In this embodiment, at least one signal characteristic, such as a received power of the signal via the second communication link, can be used to determine if the secondary winding structure of the vehicle is positioned relative to the primary winding structure such that a predetermined amount of the power transfer field, preferably the total power transfer field, can be received by the secondary unit.

The correct position and/or orientation of the secondary winding structure relative to the primary winding structure can be determined depending on a known geometric arrangement of at least one vehicle-sided transmitter unit relative to the secondary winding structure and of at least one way- or primary-sided receiving unit relative to the primary winding structure, wherein the at least one transmitter unit and the at least one receiving unit are used to perform signal transmission via the second communication link. In this case, the relative position and/or orientations of the winding structures can be determined from the relative position and/or orientation of the transmitter unit and the receiving unit.

Alternative or in addition to the analysis of signal characteristics in order to determine correct position and/or orientation, a position and/or orientation information of the vehicle can be encoded in the data transmitted via the second communication link. In this case, the vehicle can comprise a position determination unit, e.g. a GPS (global positioning system) unit for determining the vehicle position and/or orientation.

A correct position and/or orientation can be determined or approved if the position and/or orientation of the secondary winding structure relative to the primary winding structure is within a predetermined position interval and/or orientation interval, i.e. differs not more than a predetermined amount from a desired position and/or desired orientation.

A position of the secondary winding structure can e.g. be provided by a position of a centre point of the secondary winding structure, in particular a geometric centre point. A position of the primary winding structure can also be provided by, in particular geometric, centre point of the primary winding structure. It is, however, possible to use any reference point with a known spatial relation to the primary winding structure or secondary winding structure.

An orientation of the secondary winding structure can be provided by an orientation of a longitudinal axis of the secondary winding structure. This longitudinal axis can e.g. correspond to a longitudinal axis of the vehicle which can also be denoted as roll axis. In particular, the longitudinal axis can point into direction of travel if the vehicle moves forward on a flat driving surface.

The proposed embodiment advantageously allows using the signal transmitted via the second communication link for the transmission of authentication-related data and for the determination of a correct position and/or orientation simultaneously. This, in turn, reduces building costs for the vehicle and reduces space requirements. The synergetic effect of using the signal transmitting via the second communication link is therefore to use only one signal and thus only the hardware required for the transmission of said signal to achieve to multiple results, namely a secure communication and a correct positioning.

In another embodiment, a deactivation of the communication via the second communication link during or after an inductive power transfer process initiates the termination of the inductive power transfer process. If, e.g. the control unit determines that no signal is received via the second communication link, the control unit can terminate operation of the primary winding structure.

Especially in the case that the communication via the second communication link is a short distance communication, a deactivation of the communication can be caused if the vehicle moves away from the primary unit which generates the power transfer field. Thus, an improved operational safety is provided.

In another embodiment, the communication via the second communication link is deactivated if a vehicle-sided fault-condition is detected and/or the inductive power transfer process is finished. A vehicle-sided control unit can e.g. detect a fault-condition, e.g. if a current and/or voltage generated by secondary unit while receiving the power transfer field is higher than an admissible value. In this case, the vehicle-sided control unit can deactivate the at least one transmitter unit for transmitting signals via the second communication link.

Alternatively or in addition, a vehicle-sided control unit can detect if the inductive power transfer process is finished, e.g. if a desired charging state of a traction battery is achieved. This also advantageously improves an operational safety of inductive power transfer.

In another embodiment, a communication via the first communication link is initiated between the control unit and the vehicle, in particular a control unit of the vehicle, if the vehicle enters an area or volume with a predetermined size around the control unit. After or simultaneously to the initiation of the communication via the first communication link, at least one vehicle-sided transmitting unit for transmitting a signal via the second communication link is activated.

In other words, the approach of the vehicle to the inductive power transfer station (which can comprise multiple primary units) is detected depending on a communication via the first communication link. It is for instance possible that the power transfer station comprises a WLAN access point which transmits a continuous WLAN signal. Said signal can be detected by the vehicle and, upon detection, the communication via the first communication link is established. Then, the at least one transmitter unit for transmitting signals via the second communication link is activated. At this point in time, it is, however, not ensured that the signal transmitted by the at least one transmitter unit is received by a corresponding receiver unit.

This advantageously provides an energy saving method of communication since the at least one transmitter unit is only activated if a primary unit of an inductive power transfer station is within a desired proximity of the vehicle.

In another embodiment, after or simultaneously to the initiation of the communication via the first communication link, the signal transmitted via the second communication link is used to determine a correct position of the secondary winding structure relative to primary winding structure of the primary unit. The authentication-related data is only transmitted after the secondary winding structure has a correct position and/or orientation. An information encoding a correct relative positioning can e.g. be transmitted via the first communication link. After reception of the information of a correct positioning, a transmission of the authentication-related data can be started or initiated.

Alternatively, the authentication-related data can be transmitted directly after activation of the at least one vehicle-sided transmitter unit for transmitting a signal via the second communication link, in particular before a correct position and/or orientation of the secondary winding structure relative to the primary winding structure has been reached. Decoding of the signal transmitted via the second communication link, however, can only be performed, e.g. by the primary-sided control unit after the correct positioning has been achieved.

This advantageously improves an operational safety of the inductive power transfer process since charging-related data can only be exchanged if a correct positioning has been achieved.

In another embodiment, at least two vehicle-sided transmitter units for transmitting signals via the second communication link are activated. The at least two transmitter units can transmit the same signal with a predetermined time shift relative to each other. In particular, the at least two transmitter units can transmit the signal sequentially, wherein only one transmitter unit is activated at a certain point in time. In this case, the control unit can comprise one or more receiving units for receiving the said signals.

This advantageously provides a redundancy concerning a signal transmission via the second communication link and also improves the determination of the correct position and/or orientation of the secondary winding structure relative to the primary winding structure since two independent signals can be evaluated.

Also proposed is a vehicle comprising a secondary unit with a secondary winding structure for receiving an alternating electromagnetic field. A control unit controls a generation of the alternating electromagnetic field by primary unit of the system for inductive power transfer. The vehicle comprises a transmitter-receiver unit for transmitting charging-related data between the vehicle and the control unit via a first communication link.

An inductive power transfer station which comprises the control unit can also comprise a corresponding transmitter-receiver unit to perform a communication via the first communication link.

According to the invention, the vehicle comprises a transmitter unit arrangement for transmitting a signal which can comprise at least authentication-related data from the vehicle to the control unit via a second communication link. The transmitter unit arrangement comprises at least a first transmitter unit. The authentication-related data is usable to authenticate the charging-related data.

Preferably, the transmitter unit arrangement comprises more than one transmitter unit, especially in a predetermined and known geometric arrangement relative to a secondary winding structure of the secondary unit. As explained before, the at least first transmitter unit can be a short distance transmitter unit. In particular, the at least first transmitter unit can be designed such that a predetermined bundling of radio waves is achieved. Such vehicle advantageously provides a vehicle which is able to perform the previously explained method of communication.

In another embodiment, the transmitter unit arrangement comprises at least two transmitter units for transmitting signals which can encode at least the authentication-related data from the vehicle to the control unit via the second communication link. This advantageously provides two independent signals which can be used for a redundant communication and for an improved positioning of the vehicle relative to the primary winding structure of the primary unit.

In a preferred embodiment, the transmitting unit arrangement is designed and/or arranged with respect to the secondary unit, in particular with respect to secondary winding structure of the secondary unit, such that a position and orientation of the secondary winding structure, in particular a position and/or orientation relative to a primary winding structure, can be unambiguously determined depending on at least the signal(s) transmitted by the transmitting unit arrangement. As explained previously, such a determination can be performed depending on signal characteristics of the signal(s). Additionally, an identity of the transmitter units of the transmitting unit arrangement can be transmitted and also used for determination of the relative position and/or orientation.

In other word, a knowledge of the geometric arrangement of one or multiple transmitter units relative to the secondary winding structure (and relative to each other) can be used to ambiguously determine the position and/or orientation of the secondary winding structure relative to a primary winding structure depending on the transmitted signal(s), in particular depending on at least one characteristic of the transmitted signal(s).

Further proposed is an arrangement of a vehicle comprising a secondary unit of a system for inductive power transfer with a secondary winding for receiving an alternating electromagnetic field and a primary unit of the system for inductive power transfer with a primary winding structure. An inductive power transfer station which comprises the primary unit can comprise a control unit. The control unit controls generation of the alternating electromagnetic field by the primary unit.

The vehicle comprises a vehicle-sided transmitter-receiver unit for transmitting charging-related data between the vehicle and the control unit via a first communication link. The inductive power transfer station, in particular the primary unit, comprises a primary-sided transmitter-receiver unit for transmitting the charging-related data between the vehicle and the control unit via the first communication link.

According to the invention, the vehicle comprises a transmitter unit arrangement for transmitting a signal which can encode at least authentication-related data from the vehicle to the control unit via a second communication link. The transmitter unit arrangement comprises at least a first transmitter unit.

The primary unit comprises a receiving unit arrangement for receiving the signal transmitted via the second communication link. This means that the receiving unit arrangement is assigned to the primary unit. The receiving unit arrangement comprises at least a first receiving unit.

The transmitter unit(s) of the transmitter unit arrangement can be arranged with a known geometric configuration relative to the secondary unit, in particular to the secondary winding structure. Accordingly, the receiver unit(s) can be arranged with a known geometric configuration relative to the primary unit, in particular the primary winding structure.

This advantageously allows determining correct position and/or orientation of the secondary winding structure relative to the primary winding structure depending on the signal(s) transmitted via the second communication link. In particular, signal characteristics and, if applicable, a transmitter unit identity can be derived from the signal transmitted via the second communication link, wherein a relative position, e.g. in form of a distance, of the transmitter unit and a receiving unit can be determined. Said relative position and/or orientation can then be used to determine the relative position and/or orientation of the secondary winding structure and the primary winding structure.

Preferably, the transmitter unit arrangement comprises at least two transmitter units which are arranged with a known relative position with respect to each other.

The proposed arrangement advantageously allows a secure communication for a transmission of charging-related data, wherein also a correct positioning can be provided.

In another embodiment, the transmitter unit arrangement and the receiving unit arrangement are designed and/or arranged with respect to each other such that a position and/or orientation of the secondary unit, in particular the secondary winding structure, relative to the primary unit, in particular the primary winding structure, can be unambiguously be determined depending at least on the signal(s) transmitted by the transmitter unit arrangement.

Such an arrangement advantageously improves the positioning quality.

The invention will be described with reference to the attached figures. The attached figures show.

BRIEF DESCRIPTION OF THE DRAWINGS

DETAILED DESCRIPTION OF THE INVENTION

Figure 1:
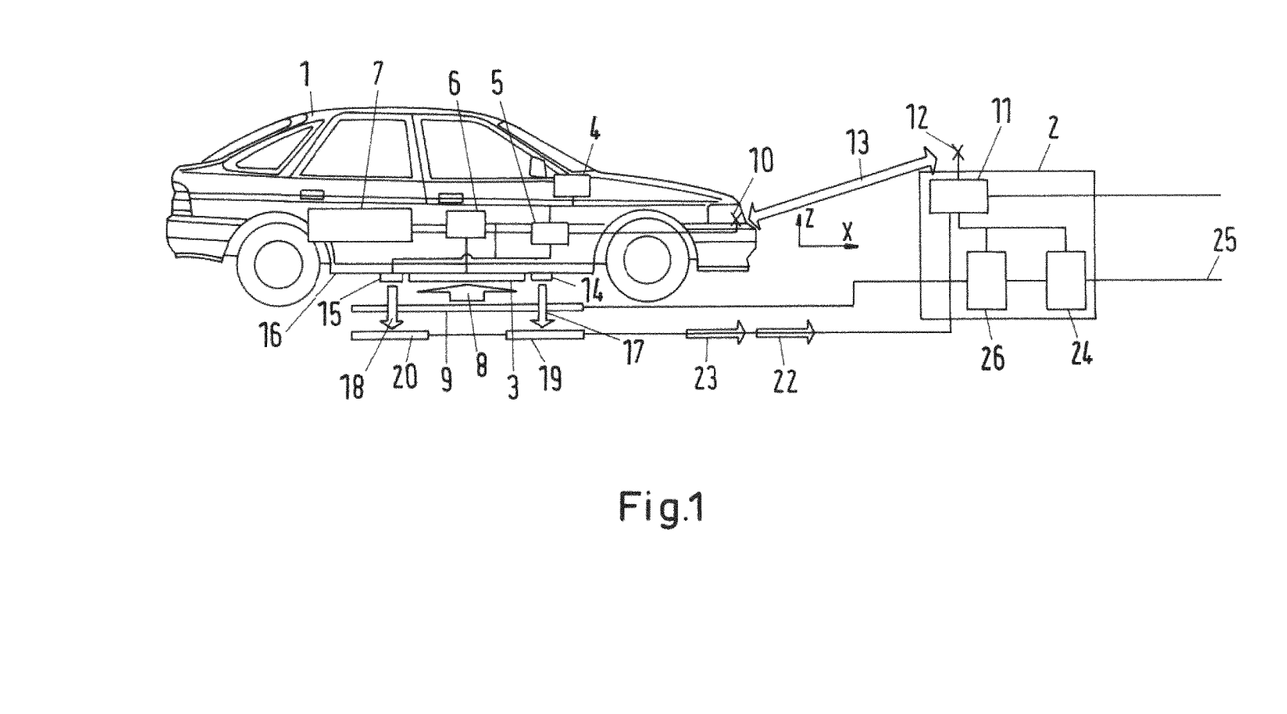
FIG. 1 a schematic side view of a vehicle and a charging station.

FIG. 1 shows a schematic side view of a vehicle 1 and an inductive power transfer station 2. The vehicle 1 comprises a secondary unit 3 of a system for inductive power transfer. The secondary unit 3 can also be referred to as receiving device or pick-up. Not shown is a secondary winding structure which is part of the secondary unit 3. Further shown is that the vehicle 1 comprises a human-machine-interface 4 which can be used to provide information to a driver or a passenger of the vehicle 1. The human-machine-interface 4 is connected to a vehicle-sided control unit 5 via a data connection. Further shown is that the vehicle comprises a rectifier 6 and a traction battery 7. The rectifier 6 rectifies an alternating current output voltage which is generated by the secondary unit 3 while receiving a power transfer field 8, wherein the power transfer field 8 is generated by a primary unit 9. Not shown is a primary winding structure which is part of the primary unit 9. The rectified voltage is used to transfer electric energy to the traction battery 7. Thus, the secondary unit 3, the rectifier 6 and the traction battery 7 are connected by power connections. Further shown is that the vehicle-sided control unit 5 is additionally connected to the rectifier 6 by a data connection in order to control an operation of the rectifier 6.

The vehicle 1 further comprises a vehicle-sided transmitter-receiver unit 10 for transmitting charging-related data between the vehicle 1 and a wayside control unit 11 of the inductive power transfer station 2. It is shown that the inductive power transfer station 2 comprises a station-sided or way-sided transmitter-receiver unit 12. In between transmitter-receiver units 10, 12 a first communication link is established which is indicated by double arrow 13. Via the first communication link 13, a bidirectional communication can be established.

Further shown is that the vehicle 1 comprises a first transmitter unit 14 and a second transmitter unit 15 which provide a transmitter unit arrangement for transmitting authentication-related data from the vehicle 1 to the control unit 11. The transmitter units 14, 15 are arranged at a bottom side 16 of the vehicle 1, in particular with a known position relative to the secondary winding structure of the secondary unit 3.

The first and the second transmitter unit 14, 15 are each designed as short distance transmitter units, wherein a main radiation direction of the transmitter units 14, 15 is oriented against a vertical direction z. The vertical direction z is oriented perpendicular to a flat driving surface. Also, the vertical direction z is parallel to a main transmission direction of the power transfer field 8.

Signals transmitted by the first and the second transmitter unit 14, 15 are indicated by arrows 17, 18 respectively. The arrows 17, 18 therefore indicate a second communication link.

The first and the second transmitter unit 14, 15 are connected to the vehicle-sided control unit 5 by a data connection.

The inductive power transfer station 2 comprises a first receiving unit 19 and a second receiving unit 20, wherein the first and the second receiving units 19, 20 are each connected to the control unit 11 by a data connection. In between the first transmitter unit 14 and the first receiving unit 19 and in between the second transmitter unit 15 and the second receiver unit 20 a unidirectional communication can be established. The unidirectional communication between each transmitter-receiver pair provides the second communication link.

The inductive power transfer station 2 further comprises the primary unit 9. The receiver units 19, 20 are arranged with a known position relative to the primary unit 9, in particular to a primary winding structure of the primary unit 9.

As the first and the second transmitter unit 14, 15 are short-distance transmitter units, a signal via the second communication link 17, 18 can only be received by the receiver units 19, 20 if the transmitter units 14, 15 are each arranged within a predetermined position relative to the receiver units 19, 20 and thus the secondary winding structure is arranged within a predetermined position and orientation relative to the primary winding structure. In particular, a correct positioning of the secondary winding structure relative to the primary winding structure can only be detected if both receiver units 19, 20 receive a signal via the second communication link 17, 18 with a reception power which is higher than a predetermined threshold value.

Schematically shown is that the first and the second transmitter units 14, 15 transmit signals in an alternating sequence. For instance, the first transmitter unit 14 transmits a sequence of a predetermined number, e.g. 16, of datagrams with predetermined transmission rate, e.g. every 100 ms. The transmission duration can e.g. be 45 ms. The second transmitter unit 15 can transmit the same signal with the same transmission rate but with a time shift of 50 ms with respect to the datagrams transmitted by the first transmitter unit 14. However, only one transmitter unit 14, 15 can be activated at a certain point in time. A datagram 22 transmitted by the first transmitter unit 14 and a datagram 23 transmitted by second transmitter unit 15 are exemplary shown on the data connection of the receiver units 19, 20 and the control unit 11.

The transmitter units 14, 15 can transmit signals at a frequency of 400 kHz or in a predetermined frequency range around 400 kHz. The datagrams 22, 23 or a telegram which consists of multiple datagrams 22, 23 can encode a transmitter identity. Thus, the station-sided control unit 11 can assign a specific datagram 22, 23 or a specific telegram to the first or the second transmitter unit 14, 15.

Further, the signals 17, 18 which encode the datagrams 22, 23 also identify a correct position of the secondary winding structure relative to the primary winding structure as explained previously.

Furthermore, the datagrams 22, 23 or resulting telegrams can include a predetermined amount of usage data or payload data. The usage data can encode a key certificate which provides a public-key of the vehicle 1. The wayside control unit 11 can use the key certificate to encrypt data, in particular charging-related data which is to be transmitted from the wayside control unit 11 to the vehicle 1. For example, the wayside control unit 11 can transmit an encrypted public-key of the wayside control unit 11 to the vehicle 1. After reception and decryption of said public-key of the wayside control unit 11, the vehicle 1, in particular the vehicle-sided control unit 5, can use the public-key certificate of the wayside control unit 11 in order to encrypt data which is to be transmitted from the vehicle to the inductive power transfer station 2.

As can be seen from FIG. 1, the encryption and decryption of data communicated via the first communication link 13 is only possible after a correct positioning of the secondary winding structure of the vehicle 1 relative to the primary winding structure of primary unit 9 is achieved since only in this case, the signals 17, 18 which encode the public-key certificate of the vehicle 1 can be received by this inductive power transfer station 2.

Since receiver units 19, 20 are assigned to a specific primary unit 9, it is also possible to assign the data which is received by the wayside control unit 11 via the first communication link 13 to the specific vehicle 1 arrange of above the specific primary unit 9. This assignment is unambiguously. This is of advantage in particular if multiple vehicles are arranged above multiple primary units which are controlled by the wayside control unit 11 while all vehicles communicate via first communication channels respectively.

Further shown is that the inductive power transfer station 2 comprises another rectifier 24 which is connected to a power line 25. Further, the inductive power transfer station 2 comprises an inverter 26 which provide an alternating current output voltage to operate a primary winding structure (not shown) of the primary unit 9. Therefore, the inverter 26 is connected to the primary unit 9 via a power line. Further shown is that the wayside control unit 11 is connected to the other rectifier 24 and the inverter 26 by a data connection in order to control an operation of the other rectifier 24 and the inverter 26.

If the vehicle 1 approaches the inductive power transfer station 2, the wayside control unit 11 associates with the vehicle-sided control unit 5 via the first communication link 13, in particular via a WLAN-based communication. A driver of the vehicle 1 will be informed about the inductive power transfer station 2 via the human-machine interface 4. Information can contain e.g. information on a suitable primary unit 9 which allows the best inductive power transfer.

Simultaneously to the association via the first communication link 13, transmitter units 14, 15 will be activated in order to communicate simultaneously via a second communication link 17, 18. After the vehicle 1 has reached a correct position relative to the primary unit 9 such that the secondary winding structure is correctly positioned and oriented relative to the primary winding structure, the receiver units 19, 20 will receive signals of the transmitter units 14, 15 which, e.g. each, transmit a signal encoding the aforementioned public-key certificate of the vehicle 1. In this case, the correct positioning is also detected.

After the transmission of the public-key certificate of the vehicle 1, a secure communication between the vehicle 1 and the inductive power transfer station 2 via the first communication link 13 can be established. A charging process can be manually activated by the driver or automatically, in particular if all necessary information for charging is available.

In case of a fault or case of examination of the charging process, the transmitter unit 14, 15 will be deactivated. If the wayside control unit 11 does not receive any signals via the second communication links 17, 18, the inductive power transfer will be immediately terminated by the station-sided control unit 11.

Figure 2:
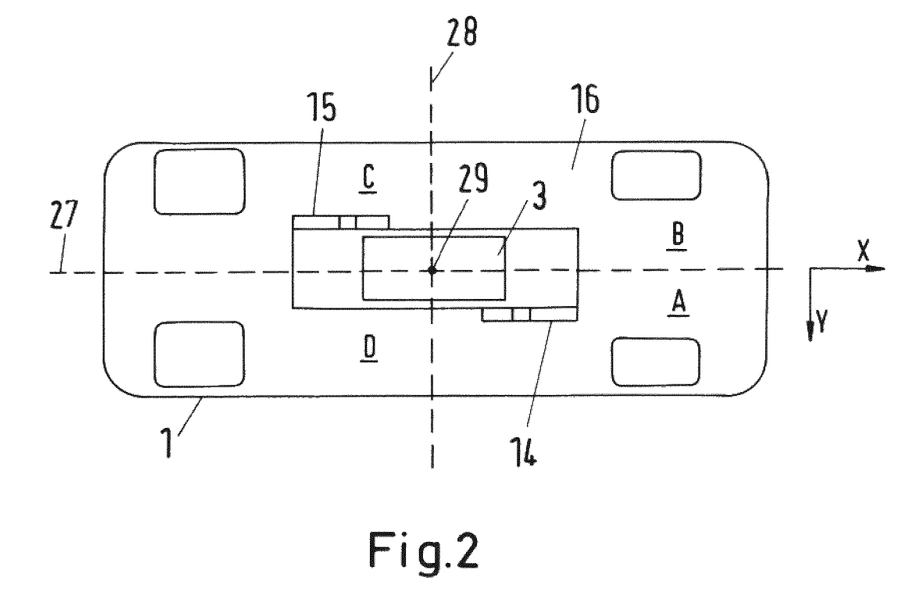
FIG. 2 a schematic bottom view of the vehicle shown in FIG. 1.

FIG. 2 shows a bottom view of a vehicle 1. Shown is a longitudinal axis 27 which extends into a longitudinal direction x and corresponds to a driving direction of the vehicle 1 if the vehicle 1 travels straight forward. The longitudinal axis 27 can also be parallel to a roll axis of the vehicle. Further shown is a lateral axis 28 which extends into a lateral direction y. The longitudinal direction x and the lateral direction y define a plane which is parallel to a flat driving surface. The longitudinal axis and the lateral axis 28 define a point of intersection 29. The point of intersection 29 can also be a geometric centre of a secondary winding structure of a secondary unit 3.

Also shown is a first transmitter unit 14 and a second transmitter 15 for transmitting signals via second communication links 17, 18 (see FIG. 1). The first and the second transmitter unit 14, 15 and the secondary unit 3 are installed at a bottom side 16 of the vehicle 1.

The longitudinal axis 27 and the lateral axis 28 define four sub-planes A, B, C, D. A first sub-plane A defines a right front sub-plane with respect to the intersection point 29 and the longitudinal and lateral direction x, y. A second sub-plane B is a left front sub-plane with respect to the intersection point 29 and the longitudinal and lateral direction x, y. A third sub-plane C is a left back sub-plane and a fourth sub-plane E is a back right sub-plane with respect to the intersection point 29 and the longitudinal and lateral direction x, y.

It is shown that the first transmitter unit 14 is arranged within the first sub-plane A, wherein the second transmitter unit 15 is arranged in the third sub-plane C. In other word, the first transmitter unit 14 is arranged ahead of the lateral axis 28 and to the right of the longitudinal axis 27 with respect to the longitudinal and lateral direction x, y. The second transmitter unit 15 is arranged behind the lateral axis 28 and to the left of the longitudinal axis x.

Receiver units 19, 20 (see FIG. 1) of a primary unit 9 should be arranged correspondingly on or within a driving surface. In such a corresponding configuration, the first transmitter unit 14 will be located directly above the first receiver unit 19 if the secondary winding structure is correctly positioned above primary winding structure of the primary unit 9. Directly above means for example that geometric centre points of the transmitter 14 and the receiver units 19 are located on a common line which extends parallel to a vertical direction z (see FIG. 1). Correspondingly, the second transmitter unit 15 can be located directly above a second receiver unit 20 if the secondary winding structure is correctly positioned above the primary winding structure.

The invention claimed is:

1. A method of communication between a vehicle and a wayside control unit for controlling an inductive power transfer to the vehicle, comprising the steps of:
   controlling with a control unit a generation of an electromagnetic field by a primary unit with a primary winding structure of a system for inductive power transfer, wherein the vehicle comprises a secondary unit with a secondary winding structure for receiving an alternating electromagnetic field, wherein charging-related data is transmitted in between the vehicle and the control unit via a first communication link;
   transmitting authentication-related data from the vehicle to the control unit via a second communication link, wherein the authentication-related data encodes a key certificate which provides a public key, wherein the key certificate is used to encrypt the charging-related data; and
   initiating a communication, via the first communication link, between the control unit and the vehicle if the vehicle enters an area of predetermined size around an inductive power transfer station, wherein after or simultaneously to the initiation of the communication via the first communication link, at least one vehicle-sided transmitter unit for transmitting a signal via the second communication link is activated.

2. The method according to claim 1, wherein the communication via the first communication link is a bidirectional communication and the communication via the second communication link is a unidirectional communication.

3. The method according to claim 1, wherein the communication via the first communication link is WLAN-based communication or the communication via the second communication link is a short distance communication.

4. The method according to claim 1, wherein the authentication-related data is transmitted as a digital certificate.

5. The method according to claim 1, wherein the authentication-related data is only valid during a single inductive power transfer process.

6. The method according to claim 1, wherein data encoding a transmitter identity is transmitted from the vehicle to the control unit via the second communication link.

7. The method according to claim 1, wherein a signal transmitted via the second communication link is used to determine a correct position or orientation of the secondary winding structure relative to the primary winding structure of the primary unit.

8. The method according to claim 1, wherein a deactivation of the communication via the second communication link during or after an inductive power transfer process initiates the termination of the inductive power transfer process.

9. The method according to claim 8, wherein the communication via the second communication link is deactivated if a vehicle-sided fault-condition is detected and/or the inductive power transfer process is finished.

10. The method according to claim 1, wherein after or simultaneously to the initiation of the communication via the first communication link, the signal transmitted via the second communication link is used to determine a correct position or orientation of the secondary winding structure relative to the primary winding structure of the primary unit, wherein the authentication-related data is only transmitted or decoded after the secondary winding structure has a correct position.

11. The method according to claim 1, wherein at least two vehicle-sided transmitter units for transmitting signals via the second communication link are activated.

12. A vehicle comprising:
   a secondary unit with a secondary winding structure of the system for inductive power transfer for receiving an alternating electromagnetic field;
   a transmitter-receiver unit for transmitting charging-related data between the vehicle and a wayside control unit via a first communication link, wherein the wayside control unit controls a generation of the alternating electromagnetic field by a primary unit of the system for inductive power transfer; and
   a transmitter unit arrangement for transmitting a signal encoding at least authentication-related data from the vehicle to the control unit via a second communication link, wherein the authentication-related data encodes a key certificate which provides a public key, wherein the transmitter unit arrangement comprises at least a first transmitter unit, wherein the key certificate is used to encrypt the charging-related data;
   wherein a communication via the first communication link is initiatable between the control unit and the vehicle if the vehicle enters an area of predetermined size around an inductive power transfer station, wherein after or simultaneously to the initiation of the communication via the first communication link, at least one vehicle-sided transmitter unit for transmitting a signal via the second communication link is activatable.

13. The vehicle according to claim 12, wherein the transmitter unit arrangement comprises at least two transmitter units for transmitting signals encoding at least authentication-related data from the vehicle to the control unit via the second communication link.

14. The vehicle according to claim 12, wherein the transmitting unit arrangement is designed and/or arranged with respect to the secondary unit such that a position or orientation of the secondary winding structure relative to a primary winding structure of the primary unit can be unambiguously determined depending at least on the signal transmitted by the transmitting unit configuration.

15. An arrangement of a vehicle comprising a secondary unit with a secondary winding structure of a system for inductive power transfer for receiving an alternating electromagnetic field and a primary unit of the system for inductive power transfer,
   wherein an inductive power transfer station comprises at least the primary unit with a primary winding structure, wherein a wayside control unit controls a generation of the alternating electromagnetic field by the primary unit;

a primary-sided transmitter-receiver unit for transmitting charging-related data between the vehicle and the control unit via the first communication link; and wherein the vehicle comprises a vehicle-sided transmitter-receiver unit for transmitting the charging-related data between the vehicle and the control unit via a first communication link, a transmitter unit arrangement for transmitting a signal encoding at least authentication-related data from the vehicle to the control unit via a second communication link, wherein the authentication-related data encodes a key certificate which provides a public key, wherein the transmitter unit arrangement comprises at least a first transmitter unit;

wherein the primary unit comprises a receiving unit arrangement for receiving the signal transmitted by via the second communication link;

wherein the receiving unit arrangement comprises at least a first receiving unit;

wherein the key certificate is usable to encrypt the charging-related data; and wherein a communication via the first communication link is initiatable between the control unit and the vehicle if the vehicle enters an area of predetermined size around an inductive power transfer station, wherein after or simultaneously to the initiation of the communication via the first communication link, at least one vehicle-sided transmitter unit for transmitting a signal via the second communication link is activatable.

16. The arrangement of claim 15, wherein the transmitter unit arrangement and the receiving unit arrangement are designed or arranged with respect to each other such that a position or orientation of the secondary winding structure relative to the primary winding structure can be unambiguously determined depending at least on the signal(s) transmitted by the transmitter unit arrangement.

* * * * *